US008130847B2

(12) United States Patent
Vook et al.

(10) Patent No.: US 8,130,847 B2
(45) Date of Patent: Mar. 6, 2012

(54) CLOSED-LOOP TRANSMISSION FEEDBACK IN WIRELESS COMMUNICATION SYSTEMS

(75) Inventors: Frederick W. Vook, Schaumburg, IL (US); Thomas P. Krauss, Algonquin, IL (US); Krishna Kamal Sayana, Lakemoor, IL (US); Fan Wang, Chicago, IL (US); Xiangyang Zhuang, Lake Zurich, IL (US)

(73) Assignee: Motorola Mobility, Inc., Libertyville, IL (US)

(*) Notice: Subject to any disclaimer, the term of this patent is extended or adjusted under 35 U.S.C. 154(b) by 884 days.

(21) Appl. No.: 11/937,501

(22) Filed: Nov. 9, 2007

(65) Prior Publication Data

US 2009/0122884 A1    May 14, 2009

(51) Int. Cl.
*H04L 27/28* (2006.01)
(52) U.S. Cl. ............................ 375/260; 375/259
(58) Field of Classification Search .................. 375/260, 375/259
See application file for complete search history.

(56) References Cited

U.S. PATENT DOCUMENTS

| 5,005,204 | A  | * | 4/1991 | Deaett ........................... 704/258 |
| 2004/0178954 | A1 | * | 9/2004 | Vook et al. ..................... 342/383 |
| 2007/0174038 | A1 | * | 7/2007 | Wang et al. ......................... 704/1 |
| 2007/0177681 | A1 | * | 8/2007 | Choi et al. ..................... 375/260 |
| 2007/0183529 | A1 | * | 8/2007 | Tujkovic et al. .............. 375/267 |
| 2008/0159451 | A1 | * | 7/2008 | Majonen ........................ 375/346 |

OTHER PUBLICATIONS

Syed Ali Jafar, Andrea Goldsmith; "On Optimality of Beamforning for Multiple Antenna Systems"; pp. 1-7.
Eugene Visotsky, Upamanyu Madhow; "Space-Time Transmit Precording With Imperfect Feedback"; IEEE Transactions on Information Theory, vol. 47, No. 6, Sep. 2001; pp. 2632-2639.

* cited by examiner

*Primary Examiner* — Shuwang Liu
*Assistant Examiner* — Michael Neff
(74) *Attorney, Agent, or Firm* — Roland K. Bowler II

(57) ABSTRACT

An orthogonal frequency division multiplexing wireless communication terminal, that communicates with a base unit, obtains a set of analog coefficients by transforming a transmit spatial covariance matrix, modulates the set of analog coefficients onto multiple channels to form a feedback waveform, and transmits the feedback waveform to the base unit.

22 Claims, 6 Drawing Sheets

CLOSED-LOOP TRANSMISSION FEEDBACK IN WIRELESS COMMUNICATION SYSTEMS

FIELD OF THE DISCLOSURE

The present disclosure relates generally to wireless communications and more particularly to closed-loop transmission feedback in wireless communication systems and methods.

BACKGROUND

In wireless communication systems, transmission techniques involving multiple antennas are often categorized as open-loop or closed-loop depending on the level or degree of channel response information used by the transmission algorithm. Open-loop techniques do not rely on the information of the spatial channel response between the transmitting device and the receiving device. They typically involve either no feedback or the feedback of long term statistical information that base unit may use to choose between different open loop techniques. Open-loop techniques include transmit diversity, delay diversity, and space-time coding techniques such as the Alamouti space-time block code.

Closed-loop transmission techniques utilize knowledge of the channel response to weight the information transmitted from multiple antennas. To enable a closed-loop transmit array to operate adaptively, the array must apply the transmit weights derived from the channel response, its statistics or characteristics, or a combination thereof. There are several methodologies for enabling closed-loop transmission. These are discussed in the context of the downlink of a cellular communication system in which a base station (BS) with multiple antennas transmits to a mobile station (MS) having one or more receive antennas and one or more transmit antennas. The MS may not necessarily have a number of transmit antennas as receive antennas. Exemplary closed-loop methodologies include adaptive transmit beam-forming, closed-loop single-user MIMO, and closed-loop multi-user MIMO. In these examples, the transmitter applies weighting coefficients that are derived according to an optimization algorithm to control characteristics of the transmitted signal energy.

One methodology for enabling closed-loop transmission is uplink channel sounding (ULCS) wherein the MS transmits a known pilot sequence on the uplink. In a time division duplexing (TDD) system in which the BS array is calibrated for transceiver reciprocity, the ULCS signal enables the BS to estimate the uplink channel response and convert that estimate to a downlink channel estimate, which is used to compute the transmit weights under a multipath channel reciprocity assumption. In a frequency division duplexing (FDD) system, the ULCS signal can be used by the BS to compute the direction of arrival (DOA) of the signal from the MS, wherein the DOA is used to compute a set of transmit weights when the base station array is calibrated for both uplink and downlink frequencies.

Another methodology for enabling closed-loop transmission is direct channel feedback (DCFB), wherein the MS measures the downlink channel response and encodes that channel response as an analog signal to be conveyed on the uplink. The downlink channel response estimates are encoded along with known pilot signals that enable the BS to estimate the analog values of the downlink channel estimates. DCFB can be applied to both FDD and TDD systems.

Another methodology for enabling closed-loop transmission is codebook index feedback in which both the BS and MS maintain a finite codebook of possible transmit weight vectors or matrices, depending on the number of simultaneous transmit beams being formed. The MS measures the downlink multi-antenna channel response and computes the transmit weight vector or matrix that is best used to transmit information. The MS then transmits the index into the codebook back to the BS, where the index into the codebook is often called a Precoding Matrix Index (PMI). The BS uses the transmit weight vector or matrix corresponding to the index fed back by the MS. Codebook index feedback can be applied to both FDD and TDD systems.

Another methodology for enabling closed-loop transmission is quantized channel feedback wherein the MS measures the downlink channel and quantizes the channel response into digital form in which some number of bits are used to convey gain information and some number of bits are used to convey phase information for a given channel coefficient. Variations on this methodology are also possible.

In principle, the various methodologies for enabling closed-loop transmission provide good performance. However, there are implementation problems and constraints that often hinder performance. For example, the effectiveness of ULCS and DCFB can be limited by a low Signal to Noise Ratio (SNR) on the uplink due to the MS transmit power being much less, for example, 9-18 dB less, than that of a BS. With a low SNR uplink, ULCS and DCFB are effective at providing channel response information for a narrow band of the broadband channel due the ability of the MS to concentrate transmit power on the narrow band. However to provide channel response information for the entire band, the low transmit power of the MS (relative to the BS) often limits the ability of ULCS or DCFB techniques to provide good closed-loop performance on the DL. Also, quantized feedback may require large amounts of feedback but with worse performance than PMI feedback. Furthermore, PMI feedback can in many cases be inferior to ULCS due to a form of quantization error resulting from the finite number of transmit weight vectors/matrices to choose from. Thus there is a need for an improved feedback methodology to enable closed-loop transmit antenna array techniques in wireless communication systems.

The various aspects, features and advantages of the disclosure will become more fully apparent to those having ordinary skill in the art upon a careful consideration of the following Detailed Description thereof with the accompanying drawings described below. The drawings may have been simplified for clarity and are not necessarily drawn to scale.

DETAILED DESCRIPTION

Figure 1:
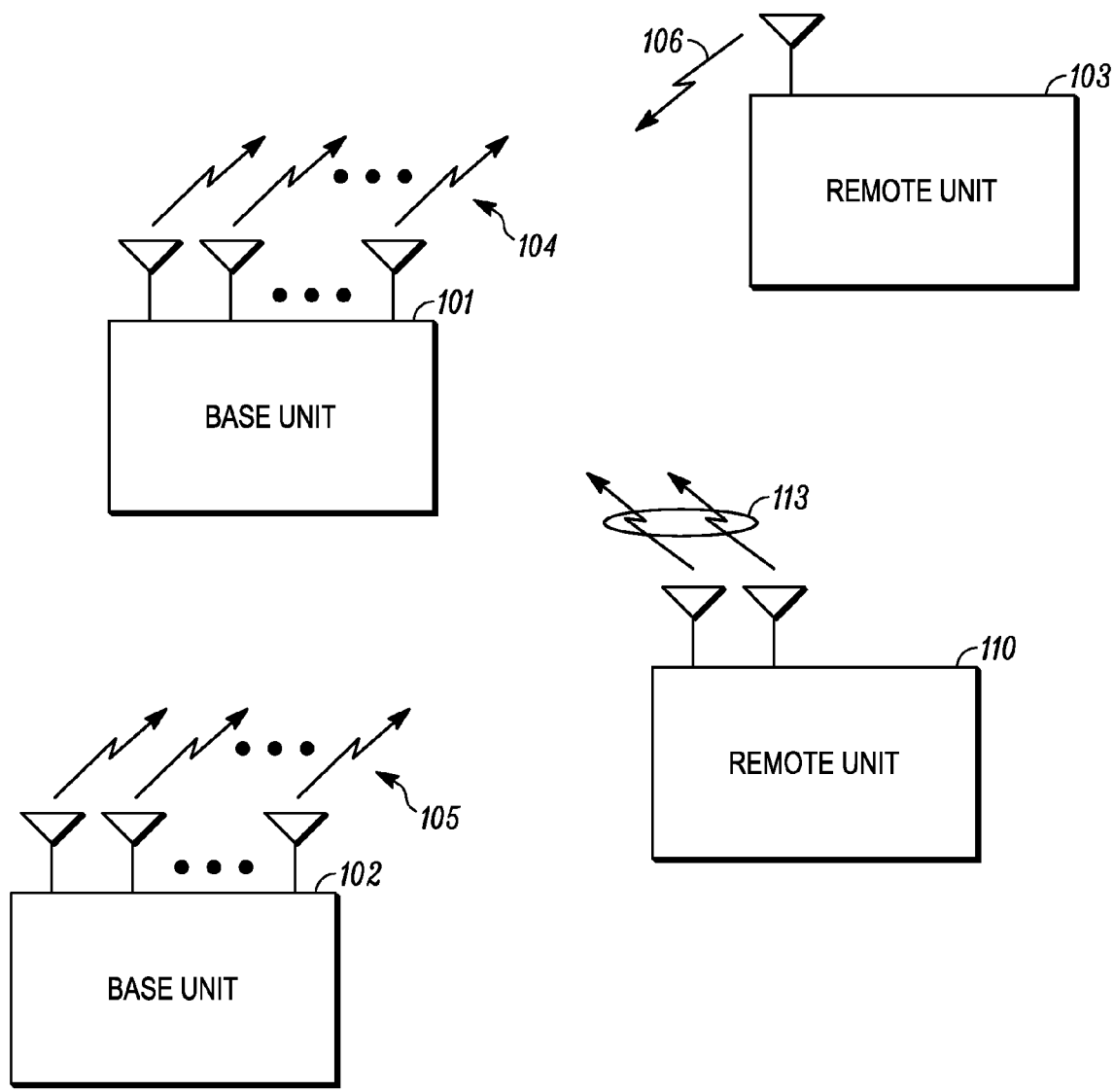
FIG. 1 is a wireless communication system.

In FIG. 1, the wireless communication system 100 includes one or more fixed base infrastructure units forming a network distributed over a geographical region. The base unit may also be referred to as an access point, access terminal, base station, Node-B, eNode-B, or by other terminology used in the art. In FIG. 1, the one or more base units 101 and 102 serve a number of remote units 103 and 110 within a serving area, for example, a cell, or within a cell sector. In some systems, one or more base units are communicably coupled to a controller forming an access network that is communicably coupled to one or more core networks. The disclosure however is not intended to be limited to any particular wireless communication system.

Generally, the serving base units 101 and 102 transmit downlink communication signals 104 and 105 to remote units in the time and/or frequency domain. Remote units 103 and 110 communicate with one or more base units 101 and 102 via uplink communication signals 106 and 113. The one or more base units may comprise one or more transmitters and one or more receivers that serve the remote units. The remote units may be fixed or mobile user terminals. The remote units may also be referred to as subscriber units, mobile stations, users, terminals, subscriber stations, user equipment (UE), user terminals, or by other terminology used in the art. The remote units may also comprise one or more transmitters and one or more receivers. The remote units may have half duplex (HD) or full duplex (FD) transceivers. Half-duplex transceivers do not transmit and receive simultaneously whereas full duplex terminals do.

In one embodiment, the communication system utilizes OFDMA or a multi-carrier based architecture including Adaptive Modulation and Coding (AMC) on the downlink and next generation single-carrier (SC) based FDMA architecture for uplink transmissions. SC based FDMA architectures include Interleaved FDMA (IFDMA), Localized FDMA (LFDMA), DFT-spread OFDM (DFT-SOFDM) with IFDMA or LFDMA. In OFDM based systems, remote units are served by assigning downlink or uplink radio resources that typically consist of a set of sub-carriers over one or more OFDM symbols. Exemplary OFDM based protocols include the developing Long Term Evolution (LTE) of the 3GPP UMTS standard and IEEE 802.16 standard. The architecture may also include the use of spreading techniques such as multi-carrier CDMA (MC-CDMA), multi-carrier direct sequence CDMA (MC-DS-CDMA), Orthogonal Frequency and Code Division Multiplexing (OFCDM) with one or two dimensional spreading, or may be based on simpler time and/or frequency division multiplexing/multiple access techniques, or a combination of these various techniques. In alternate embodiments, the communication system may utilize other cellular communication system protocols including, but not limited to, TDMA or direct sequence CDMA.

Figure 2:
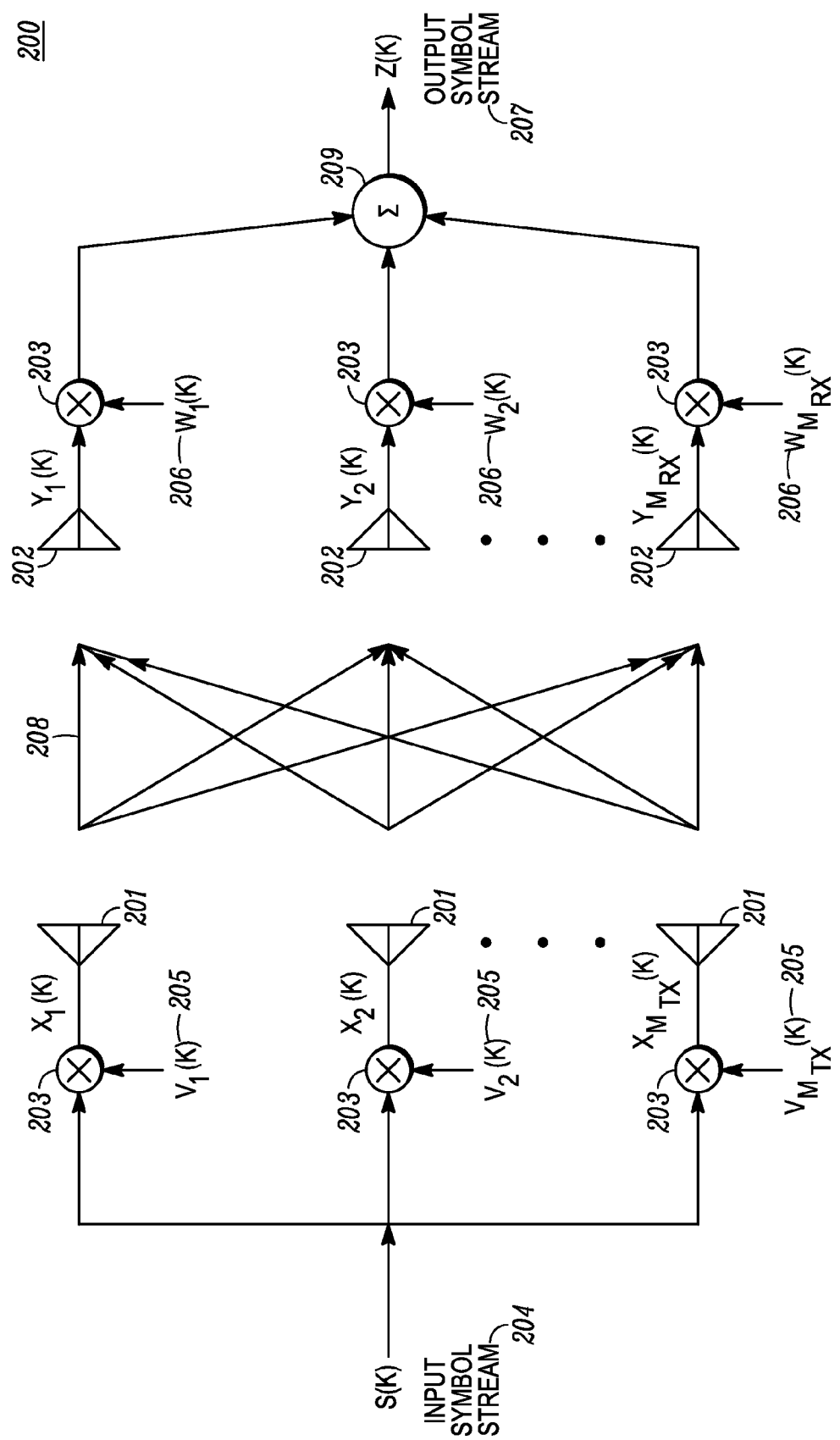
FIG. 2 is a block diagram of a closed-loop transmit antenna array communicating a single data stream to a receiving device.

FIG. 2 is a block diagram of a closed-loop transmit antenna array as part of a base unit communicating a single data stream to a receiving device as part of a remote unit having one or more receive antennas. Input stream 204 is multiplied by transmit weights 205 using multipliers 203 before being fed to the multiple transmit antennas 201. Multiplying input stream 204 by transmit weights 205, where the transmit weights are based on at least a partial channel response, is an example of tailoring a spatial characteristic of the transmission. Methods for determining the transmit weights from the channel response are discussed more fully below. The signals transmitted from the multiple transmit antennas 201 propagate through a matrix channel 208 and are received by multiple receive antennas 202. The signals received on the multiple receive antennas 202 are multiplied by receive weights 206 using multipliers 203 and summed by a summation device 209 to produce an output symbol stream 207. In embodiments where the transmitter has only a single antenna, the spatial characteristic of the transmit signal cannot be tailored. However, other characteristics of the transmit signal may be tailored based on at least a partial channel response, such as the complex gain of each sub-carrier (e.g., in a pre-equalization application), or the modulation and coding used on the sub-carriers of the transmit signal.

Figure 3:
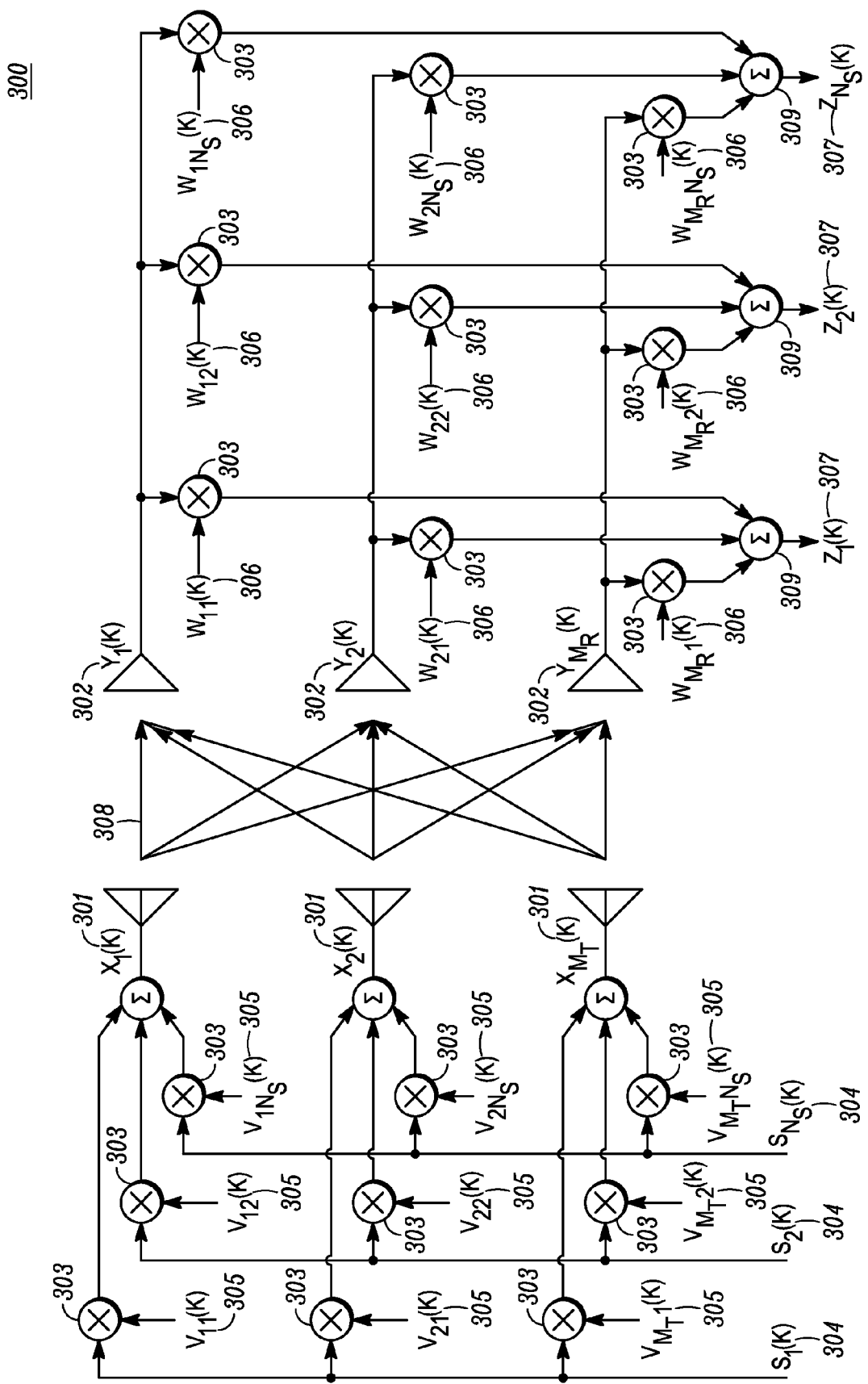
FIG. 3 is a block diagram of a closed-loop transmit antenna array communicating multiple data streams to a receiving device.

FIG. 3 is a block diagram of a closed-loop transmit antenna array as part of a base unit communicating multiple data streams to a remote unit having one or more receive antennas, for example, a MIMO system. Multiple input streams 304 are multiplied by transmit weights 305 using multipliers 303 before being fed to the multiple transmit antennas 301. The signals transmitted from the multiple transmit antennas 301 propagate through a matrix channel 308 and are received by multiple receive antennas 302. The signals received on the multiple receive antennas 302 are multiplied by receive weights 306 using multipliers 303 and summed by summation devices 309 to produce the multiple output symbol streams 307. Multiplying input streams 304 by transmit weights 305 where the transmit weights are based on at least a partial channel response is another example of tailoring a spatial characteristic of the transmission. Other schemes for producing the output symbol streams 307 are possible such as maximum likelihood detection or successive cancellation that may or may not use the receive weights 306 and the multipliers 303.

Figure 4:
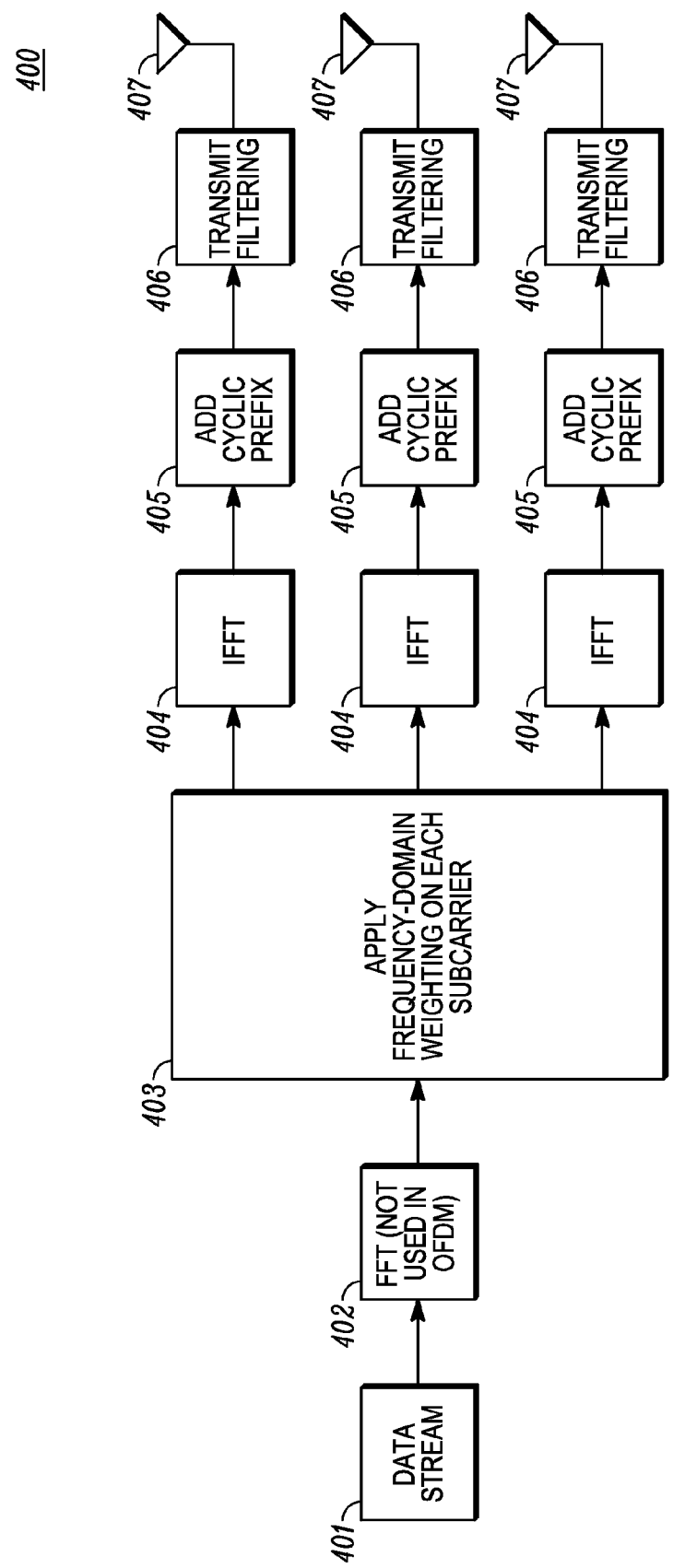
FIG. 4 is a block diagram of a frequency domain-oriented broadband transmission system employing a closed-loop transmit antenna array.

FIG. 4 is a block diagram of a frequency-domain oriented transmission system such as Orthogonal Frequency Division Multiplexing (OFDM) or cyclic prefix single carrier (CP-Single Carrier) in which the transmission techniques of FIG. 2 and FIG. 3 are performed in the frequency domain prior to transmission. In a CP-Single Carrier system, one or more data streams 401 are first brought into the frequency domain with one or more FFTs 402 and the frequency domain data streams are weighted with frequency domain weighting apparatus 403. In OFDM, the one or more data streams 401 are sent directly to frequency domain weighting apparatus 403 without the use of FFT 402. The frequency domain weighting apparatus 403 implements the weighting function shown in the transmit portion of FIG. 2 and FIG. 3 on each sub-carrier or frequency bin in the frequency domain. Thus, the transmit signal can be tailored either spatially, or in frequency, or both with this type of a system. The outputs of the frequency domain weighting apparatus 403 are then brought back into the time domain with IFFTs 404. Cyclic prefixes are added 405 as is known in the art. Transmit filtering 406 is then performed before sending the transmitted signals to the transmit antennas 407.

A spatial covariance matrix or more generally 'spatial transmit covariance matrix' captures the correlations between various transmit antennas as experienced in a certain propagation environment. It also captures the received power at the terminal corresponding to each transmit antenna. An instantaneous covariance matrix can be defined for each data sub-carrier i, based on the downlink channel estimates available at a time instant (hence can also be referred to as a short-term covariance matrix)

$$\hat{R}_i = \hat{H}_i^H \hat{H}_i \tag{1.1}$$

where $\hat{H}_i$ is the $N_R \times N_T$ channel matrix estimated by the terminal on the downlink. A remote unit can accumulate or average the per-subcarrier instantaneous or short-term covariance matrix over multiple subcarriers. A narrow band covariance matrix is accumulated over subcarriers that encompass a small portion of the operational bandwidth (sometimes refer to as "sub-band"). A wideband or broadband covariance matrix is accumulated over the entire band or a large portion of the band. A remote unit can also accumulate an instantaneous covariance matrix over time to obtain a long-term statistical spatial covariance matrix. In another form, a remote unit may compute the above estimate by including only the rows in the channel matrix corresponding to a subset of the receive antennas on which measurements are available. Also note that a remote unit may obtain the covariance matrix without having to estimate the channel explicitly, for example, by correlating the received pilots sent from each transmit antenna.

Figure 5:
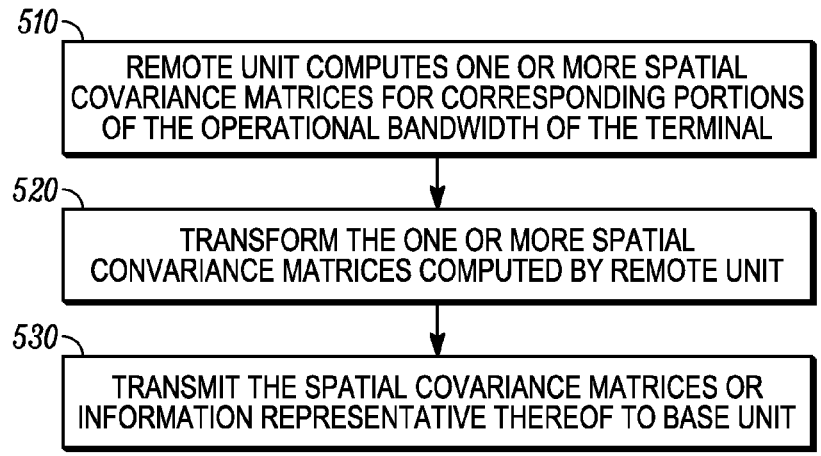
FIG. 5 is a flow chart for a process performed by a wireless communication user terminal.

In the process diagram 500 of FIG. 5, at 510, according to one aspect of the disclosure the remote unit computes one or more spatial covariance matrices. At 530, the remote unit transmits the one or more matrices to the base unit. In some embodiments, the remote unit transmits a transformed spatial covariance matrix to the base unit as discussed further below. As suggested above, the base unit uses the spatial covariance matrix or matrices to compute transmit weights and for other purposes as will become more fully apparent from the discussion herein. In one embodiment, the remote unit computes the spatial covariance matrix based on a measured downlink matrix channel response. The computation of spatial covariance matrices is known generally by those having ordinary skill in the art. The present disclosure is not intended to be limited to any particular method or technique of computing a spatial covariance matrix. In some implementations, the based unit indicates which portion of the operational bandwidth for which the one or more spatial covariance matrices should be computed by the remote unit. This indication could be express or implied.

In one implementation, the remote unit computes a spatial covariance matrix and transmits the matrix or a representation thereof to the base unit. In one embodiment, the base unit uses the spatial covariance matrix received from the remote unit to compute beamforming weights (i.e., a complex-valued weighting factor for each transmit antenna). In one embodiment, a base unit may use the covariance matrix accumulated over the entire band for computing the beamforming weights that will then be the same on all subcarriers. In another embodiment, a base unit may use the covariance matrix specific to a portion of the band for beamforming only at the corresponding sub-band. In one embodiment, the base unit may request periodic feedback of the covariance matrix or its transformation corresponding to a portion of the band or its entirety. In one embodiment, the BS commands the MS to compute and feedback the covariance matrix on an as-needed basis or on a periodic basis.

In another embodiment, the base station uses a covariance matrix that is fed back from the MS to compute multiple transmit weight vectors for use in multi-stream beamforming or closed-loop MIMO applications where multiple spatial channels are simultaneously formed (one formed by each transmit weight vector) so as to realize a spatial multiplexing gain on the time-frequency resources used for transmission to the MS.

In another embodiment, the base station uses the covariance matrices fed back from multiple mobile stations to compute multiple transmit weight vectors for the purpose of realizing multi-user MIMO transmission (also called transmit Spatial Division Multiple Access (SDMA)) to multiple MSs simultaneously on the same time-frequency resources.

In another implementation, the remote unit computes multiple spatial covariance matrices that corresponds to different portions of the operational band, and transmits the matrices or their representations thereof or their transformations thereof to the base unit per the allocation by the base unit. In one embodiment, the base unit uses the spatial covariance matrices received from the remote unit to compute transmit weights for frequency selective scheduling (FSS) applications. In another embodiment, the base unit uses the transformations of the spatial covariance matrices to compute transmit weights for frequency selective scheduling (FSS) applications. The group of subcarriers (frequency band) that are used to derive spatial covariance matrices can be chosen by a remote unit or by a base unit. The time gap from one feedback of this information to the next feedback can be decided by a remote unit or by a base unit based on factors such as remote unit moving speed, SNR, etc.

Figure 6:
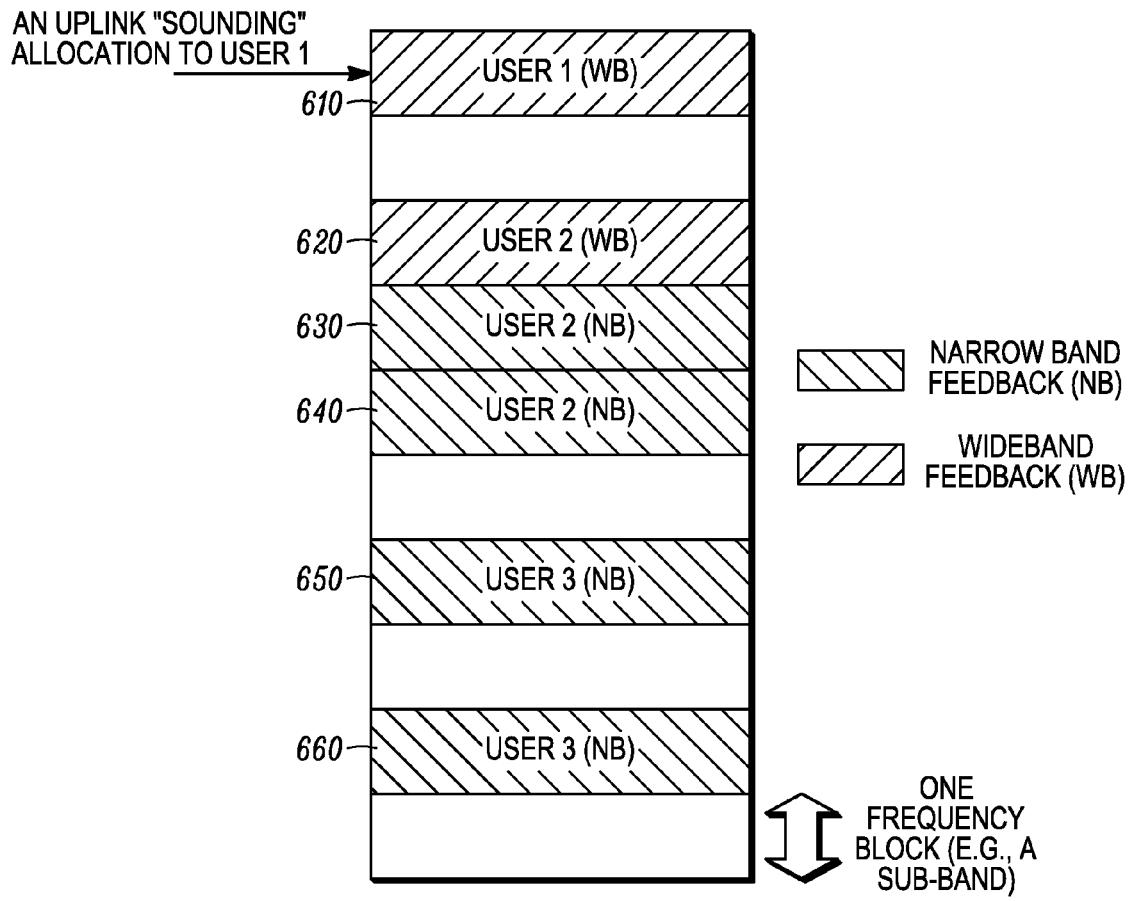
FIG. 6 is a diagram of an uplink sounding allocation with covariance feedback

FIG. 6 shows an example of a base unit allocating frequency resource (e.g., one or more bands) to multiple remote units for feeding back narrowband or wideband spatial covariance matrices. A base unit could indicate explicitly which portion of bandwidth the feedback must correspond to. In FIG. 6, user #1 is allocated one frequency block 610 (e.g., a narrow band or sub-band) to transmit back a covariance matrix corresponding to the entire band. User #2 is allocated three sub-bands (620, 630, 640) where one is used for broadband spatial covariance matrix and the other two are for narrow band spatial covariance matrices. User #3 is allocated two sub-bands (650 and 660), both of which are for narrow band spatial covariance matrices.

In one embodiment, this indication could include setting a flag to indicate wideband or narrowband feedback, where wideband feedback corresponds to the entire operational bandwidth of the terminal. For example, if the flag is set to "wideband" (or "broadband"), then the MS calculates the spatial covariance matrix based on channel responses measured across the whole system bandwidth. If the flag is set to "narrowband", then the MS calculates the spatial covariance matrix over one narrowband portion of the band. In one case, the narrowband portion of the band corresponds to the bandwidth occupied by the feedback waveform that the MS sends back. In another case, the narrowband portion of the band over which the spatial covariance matrix is computed corresponds to some other portion of the overall system bandwidth.

In addition to the above embodiment, the narrowband feedback corresponds to a pre-defined portion of the sounding allocation and could be explicitly signaled by the base unit as a band index or a similar definition.

In another embodiment, the terminal may be signaled to feedback covariance matrices corresponding to one or multiple bands that have been recommended or signaled by the remote unit to the base station on a separate feedback channel.

In one embodiment, this feedback channel could correspond to a bitmap or similar, choosing or ranking a certain number of best bands. The base station may then signal the remote unit to feedback the covariance matrix information corresponding to these bands in the sounding allocations made available to this terminal.

The multiple spatial covariance matrices fed back by a terminal generally correspond to different parts of an operational bandwidth of the remote unit. The remote unit computes a first transmit spatial covariance matrix corresponding a first portion of the operational bandwidth of the terminal and a second transmit spatial covariance matrix corresponding a second portion of the entire operational bandwidth of the terminal. In one embodiment, the second portion is the entire operational bandwidth. In another embodiment the first and second portions of the operational bandwidth are partially overlapping. In yet another embodiment, the first and second portions of the operational bandwidth for which the first and second spatial covariance matrices are computed are non-overlapping.

In one embodiment of selecting one of multiple bands for feedback, a terminal can select a set of bands out of a pre-defined total number of bands spanning the operational bandwidth and feedback the corresponding indices to the BS. The BS can use this information in addition to other information in a scheduler to decide which parts of the bandwidth to allocate for covariance feedback with uplink sounding.

In another example, the MS indicates to the base station in a feedback control message which portion of the overall operational (or system) bandwidth is preferred for transmission. The MS can select the best portion (or band or sub-band) of the overall system bandwidth based on signals received on the downlink (for example, by estimating the downlink channel and computing the best band based on the estimated downlink channel). The BS can then command the MS to send back a feedback waveform containing a representation of the covariance matrix that corresponded to the best band as indicated by the MS.

In another embodiment for example, the MS signals back to the base an indication of which five (where the number five is an arbitrary example) sub-bands out of a larger number of total bands within the overall system bandwidth are the best quality for downlink transmission. In this embodiment, the overall system bandwidth is divided into some number of non-overlapping sub-bands (for example 12), and the MS feeds back a 12 bit bitmap where five of the bits in the bitmap are set to indicate that a corresponding band is one of the five best bands for downlink transmission (and the division of the system bandwidth into 12 bands is such that 12 is an arbitrary example for illustration purposes). The remaining seven bits of the bitmap are set to indicate that those corresponding bands are not one of the five best bands for downlink transmission. The BS receives the band bitmap and learns which bands are considered best by the MS. The BS then commands the MS to send back a feedback waveform containing the representation of the five covariance matrices for each of the bands that are considered best by the MS according to the fed-back band bitmap. Meanwhile, the MS computes the spatial covariance matrix for each of the five best bands and encodes those five covariance matrices into a feedback waveform and sends that feedback waveform back to the BS on a feedback channel. Methods of encoding or transforming one or more covariance matrices into a feedback waveform are discussed in other parts of this document.

In another variation of the previous embodiment, when the MS encodes or transforms the five covariance matrices into the feedback waveform, the representation for the five covariance matrices can be scaled relative to each other, where a covariance matrix is first scaled by some factor prior to (or as part of) the process of encoding or transforming the covariance matrix to the feedback waveform. The scale factors (one scale factor per covariance matrix) are used to artificially boost the magnitude of the portion of the feedback waveform corresponding to that covariance matrix relative to the magnitudes of the portions of the feedback waveform corresponding to the other covariance matrices. When the BS receives the scaled covariance matrices in the feedback waveform, the BS can estimate which covariance matrix was boosted relative to the other covariance matrices in the feedback waveform. Each covariance matrix is computed by the MS for one of the five best bands. The MS picks one of the covariance matrices as the one to boost relative to the other four so as to indicate to the BS which covariance matrix (and thus which band) is better than the other four. In this fashion, the MS can indicate to the BS which of those five best bands is actually the best of the five best bands. When decoding the feedback waveform the BS can determine which covariance matrix was boosted stronger than the others and therefore know that the band corresponding to that boosted covariance matrix was the best band.

In another embodiment, the MS simply sends back the transformed or encoded covariance matrices corresponding to some number of bands (as requested by the BS for example) and the BS can determine the best band directly from the fed back covariance matrices, for example based on the eigenvalues of the covariance matrices.

In some embodiments, illustrated in FIG. 5 at 520, the remote unit transforms the one or more spatial covariance matrices before transmitting the spatial covariance matrix to the base unit. In embodiments where the one or more spatial covariance matrices are transformed, the remote unit transmits the transformed spatial covariance matrix to the base unit. Such a transformation may reduce signaling overhead associated with transmitting the one or more spatial covariance matrices to the base unit. Another aspect of the transformation is to encode the one or more spatial covariance matrices transmitted to the base unit with such techniques as spreading or repetition, such that the information on the spatial covariance can be retrieved more robustly with less distortion at the base unit. Another aspect of the transformation could be to retain certain channel quality information during the transformation process for reducing the signaling overhead. Each spatial covariance matrix generally comprises multiple coefficients. In one particular embodiment, the transformation of the spatial covariance matrix is performed by mapping the spatial covariance matrix coefficients onto a feedback waveform, and transmitting the feedback waveform to the base unit. These aspects of the transformation are described in more detail in the paragraphs below.

In one implementation, the feedback waveform includes multiple channels, for example the multiple subcarriers in an OFDM communication system. The multiple coefficients are used to modulate the multiple channels, similar to the way that a data symbol is modulated onto a channel in any digital communication system.

In a more particular implementation, a set of "analog" coefficients are generated from coefficients of each matrix. These analog coefficients are used to modulate the multiple channels of the feedback waveform. The term "analog coefficient" refers to the complex value as digitally stored in a processor, without being further quantized according to any finite alphabet constellation such as QPSK/QAM in a digital communication system.

A covariance matrix feedback is obtained by summing the per-subcarrier covariance matrix defined in Equation (1.1) above over all the subcarriers in the entire band or a subset of subcarriers associated with a sub-band (or allocation), whose index can be denoted as j in the mathematical expressions below. Such an association of a spatial covariance matrix to the entire or sub-band may be explicitly or implicitly signaled by BS. The implicit signaling, for example, could just be to have a pre-defined correspondence between the "sounding allocation" and the requested band for covariance feedback, where the "sounding allocation" is what a base unit will instruct the remote unit on which part of the band the feedback waveform should occupy.

The spatial covariance matrix accumulated over subcarriers that belong to the $j^{th}$ sub-band can be written as $$R = \sum_{i \in B_j} H_i^H H_i \quad (1.2)$$

where $B_j$ are the set of subcarriers associated with the band or allocation index. The matrix R is a $N_T \times N_T$ matrix which can be represented as below $$R = \begin{bmatrix} R_{11} & R_{12} & \cdots & R_{1,N_T} \\ R_{21} & & & \\ & & & \\ R_{2,N_T} & & & R_{N_T,N_T} \end{bmatrix} \quad (1.3)$$

with $N_T^2$ entries where $N_T$ denotes the number of transmit antennas.

Further, the spatial covariance matrix having multiple coefficients could be transformed into a set of mathematical coefficients. This could involve separate steps to reduce the amount of feedback information and/or indicate certain quality of the channel. The transformation produces a set of L analog coefficients.

$[V_1, V_2, \ldots V_L]_j \rightarrow$ A set of L analog coefficients that capture covariance matrix information of $j^{th}$ subband (1.4)

In one embodiment, the transformation in the above embodiment involves extracting the unique entries of the covariance matrix that is typically a Hermitian matrix, and the unique elements are diagonal elements and additionally either the elements from the upper triangle or the lower triangle of the matrix. The number of unique elements is $L=N_T(N_T+1)/2$, down from $N_T^2$ total coefficients.

In another embodiment, the selected elements of the matrix are normalized so that their mean transmit power is fixed to a constant value.

In another embodiment, the number of coefficients can be further reduced by one, by dividing the covariance matrix by the element located at the first row and first column for example, which is then normalized to one that will not need to be fed back.

In another embodiment, the covariance matrix is transformed so that all the diagonal elements are equal which reduces the number of analog coefficients to $L=N_T(N_T+1)/2-(N_T-1)$. An example of this transformation is shown below:

$$\mu = \frac{1}{N_T} \sum_{i=1}^{N_T} R_{ii} \quad (1.5)$$

$$\Phi = \text{diag}\left(\sqrt{\frac{\mu}{R_{11}}}, \sqrt{\frac{\mu}{R_{22}}}, \ldots \sqrt{\frac{\mu}{R_{N_T N_T}}}\right)$$

$$\tilde{R} = \Phi R \Phi$$

In another embodiment, two or more eigen vectors are obtained and each eigen vector is scaled by an associated scaling factor, resulting in a total of $L=2N_T$ coefficients for example in the case of two eigen vectors.

In one implementation, the associated scaling factor can be a function of one or more eigen values of the spatial covariance matrix. Specifically, the scaling factor in the above embodiment could be the square root of the eigen value of the corresponding eigen vector. This information can be used at the base unit to reconstruct an approximation of the covariance matrix information, like reconstructing a reduced-rank estimate of the covariance matrix.

In another embodiment, the analog coefficients or the feedback waveforms corresponding to different covariance matrices can be scaled in a way such that the scalar, which can be estimated by the base unit given the unit norm of an eigenvector, can be used to convey some other information of the channel, for example, the relative channel quality of the corresponding band.

In another embodiment, the transformation repeats a set of analog coefficients obtained by a first transformation according to any of the transformations disclosed, to obtain the analog coefficients. In another embodiment, the transformation uses a binary or non-binary spreading code to spread each analog coefficient from a first transformation onto the entire set of analog coefficients. In another embodiment, the analog coefficients may be a unit modulus or a quantized version of the spatial covariance matrix entries, or any general function of the covariance matrix entries.

Figure 7:
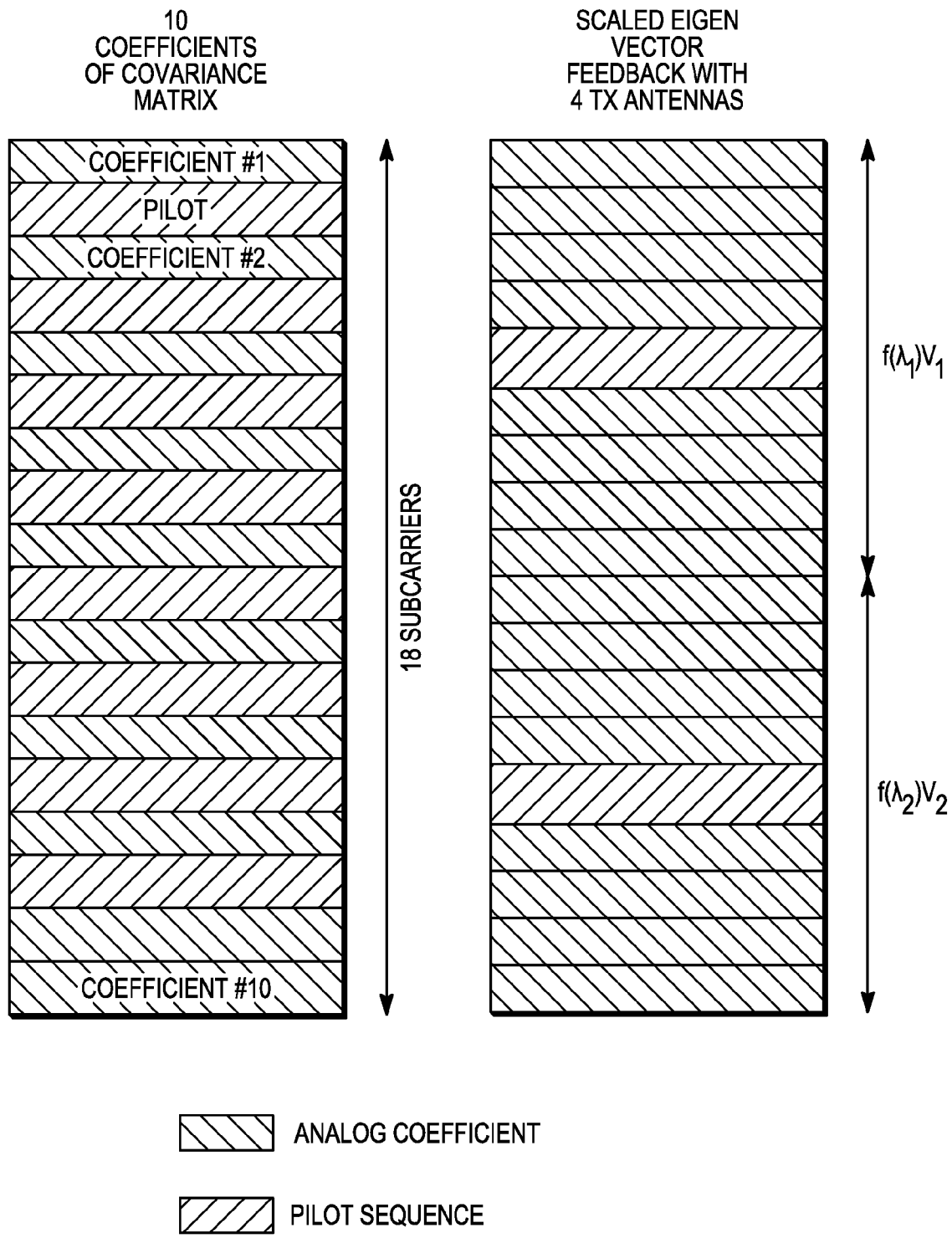
FIG. 7 is an example diagram of mapping of analog coefficients derived from a spatial covariance matrix to a feedback waveform.

In one embodiment, the analog coefficients are mapped to subcarriers as in FIG. 7. The set of L scaled coefficients are mapped to a set of L data subcarriers along with pilot subcarriers to allow the base unit to estimate the channel response. The locations of data subcarriers that are "modulated" by the analog coefficients and pilot subcarriers are designated by a base unit in an allocation to a user. The final transmitted waveform is generated from these pilots and data subcarriers, for example, via a DFT (Discrete-Fourier Transformation) in the case of using OFDM waveform.

More generally, such mapping of analog coefficients to a feedback waveform can be performed by mapping to a decimated subset of subcarriers in an allocation, so that several users can share the same allocation. Alternatively, it is possible to use different forms of spreading waveforms to multiplex the coefficients of different covariance matrices corresponding to one or more users to a sounding allocation.

Generally, in closed loop feedback systems, the base unit computes transmit weights based on the feedback information corresponding to one or more spatial covariance matrices received from the remote unit.

In FSS applications, the base unit receives multiple spatial covariance matrices or information representative thereof from each remote unit, wherein each of the spatial covariance matrices corresponds to a different part of the operational bandwidth of the remote unit. The base unit then determines a transmission waveform based on the information for the multiple spatial covariance matrices received from the remote unit.

In some implementations, the base unit determines the transmission waveform for use on the downlink based on the feedback information corresponding to the multiple spatial covariance matrices. In simple terms, the transmission waveform is a function of the one or more transmit weight vectors that are used on the subcarriers (beamforming uses one transmit weight vector per time-frequency allocation whereas spatial multiplexing, whether single or multi-user transmission, uses more than one transmit weight vector per time-frequency resource). The transmission waveform is also a function of which band on the downlink is used to transmit information to the MS.

In one embodiment, determining a transmission waveform could include selecting different MIMO transmission parameters like a number of data streams to be transmitted, spatial multiplexing or spatial diversity transmission, antenna selection or grouping, horizontal or vertical encoding. The rank of covariance matrix can be used to determine the number of data streams to be transmitted to the MS. A low rank covariance matrix may indicate that spatial diversity transmission (or coherent beamforming) is preferred to spatial multiplexing.

In another embodiment, determining a transmission waveform could include allocating different portions of the operational bandwidth to different users.

In another form of the above embodiment, the base unit performs band selection based on a relative channel quality for each of the different parts of the operational bandwidth derived from the feedback information for the multiple spatial covariance matrices from a terminal.

In one particular embodiment, such relative quality could be derived based on an explicit or implicit scaling of multiple covariance matrices performed at the terminal before they are mapped to the feedback waveform.

In another embodiment, the channel quality derived from the feedback information corresponding to the multiple spatial covariance matrices can be combined with other feedback information from different terminals connected to a base unit, to determine the allocation of different users to different parts of the operational bandwidth and the transmission parameters of each such allocation.

As shown in FIG. 6 and explained in previous paragraphs, a base unit could allocate different portions of the sounding allocation to a one or more users and request specific type of feedback for each such allocation.

In one embodiment, the base unit could determine how many allocations are assigned to a terminal for covariance feedback based on the system performance parameters of a terminal.

In a more particular form of the above embodiment, the system performance parameters could be the speed or Doppler of the mobile or more generally the rate of variation of its channel, and the uplink SNR of the terminal. Such measurements may be measured by the base unit, or otherwise obtained from the terminal.

In one embodiment, the base unit could request a particular type of feedback in an assigned allocation to a user based on certain system performance parameters, where the type corresponds to a portion of the bandwidth the covariance matrix information must be derived from at the terminal. More generally, the type could also correspond to choice of a particular transformation In a more particular form of the above embodiment, the system performance parameters could be the speed or Doppler of the mobile, and the uplink SNR of the terminal.

Some of the system parameters described above could also include the long term or short term characteristics of the downlink channel obtained by other measurements or forms of feedback obtained by the base unit.

In one particular embodiment, the priority of bands can be established by the terminal and the corresponding ranking of the bands or a set of band indices can be fedback to the base unit. The base station then uses this information with other system performance and scheduling parameters to determine the allocations and type of feedback.

In one particular embodiment, a base unit determines that a mobile is of high mobility and assigns covariance feedback information to correspond to the entire operational bandwidth.

In another particular embodiment, a base unit determines that a mobile has low SNR to support reliable sounding on many allocations. In this case, a base unit may determine to limit the number of allocations to a few depending on the SNR. These few allocations could be determined based on feedback from the mobile as described above. Further, mobility or Doppler can be used to determine, the type of feedback in these allocations.

In another particular embodiment, a base unit determines that a terminal is of low mobility but high SNR and decides to allocate many allocations requesting covariance feedback (explicitly by signaling or implicitly by location of the allocation) in each such allocation corresponding to a smaller part of the operational bandwidth. These few allocations could be determined based on feedback from the mobile as described above.

While the present disclosure and the best modes thereof have been described in a manner establishing possession by the inventors and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A method in an orthogonal frequency division multiplexing (OFDM) wireless communication terminal, the method comprising:
   computing a transmit spatial covariance matrix corresponding to a channel estimated on a first set of two or more OFDM subcarriers corresponding to a received waveform;
   obtaining a set of analog coefficients by transforming the transmit spatial covariance matrix;
   modulating the set of analog coefficients onto a first portion of a second set of two or more OFDM subcarriers corresponding to a transmitted waveform, where each analog coefficient is mapped to a single OFDM subcarrier; and
   modulating a pilot symbol onto a second portion of the second set of OFDM subcarriers, where the pilot symbol is from a finite constellation of complex symbols.

2. The method of claim 1, wherein transforming the transmit spatial covariance matrix comprises:
   extracting a set of entries of the transmit spatial covariance matrix; and
   obtaining the set of analog coefficients based on the extracted set of entries.

3. The method of claim 2 further comprising transforming the set of entries by a spreading code to obtain the set of analog coefficients.

4. The method of claim 1, wherein transforming the transmit spatial covariance matrix comprises
   computing an eigenvector of the spatial covariance matrix, scaling the eigenvector,
   obtaining entries of the scaled eigenvector as the set of analog coefficients.

5. The method of claim 4, wherein scaling includes multiplying the eigenvector by an associated factor based on a corresponding eigenvalue.

6. The method of claim 4, wherein scaling includes multiplying the eigenvector by an associated factor based on a corresponding eigenvalue of a signal to noise ratio.

7. The method of claim 4, wherein scaling includes multiplying the eigenvector by a factor chosen by the wireless communication terminal.

8. The method of claim 1 further comprising:
   computing multiple transmit spatial covariance matrices, each of the multiple spatial covariance matrices corresponding to a channel estimated on a corresponding set of two or more OFDM subcarriers corresponding to the received waveform obtaining a set of analog coefficients by transforming each of the transmit spatial covariance matrices.

9. The method of claim 1 further comprising receiving a message indicating the first set of two or more OFDM subcarriers corresponding to the received waveform.

10. The method of claim 1, obtaining the set of analog coefficients without quantization.

11. The method of claim 1 further comprising receiving a message indicating the second set of two or more OFDM subcarriers corresponding to the transmitted waveform.

12. The method of claim 1, wherein the transmit spatial covariance matrix is transformed to a second matrix wherein all diagonal elements of the second matrix are equal, and wherein the analog coefficients are obtained by extracting two or more entries of the second matrix.

13. The method of claim 12,
wherein the transmit spatial covariance matrix is transformed to the second matrix using the following transformation $$\mu = \frac{1}{N_T}\sum_{i=1}^{N_T} R_{ii}$$

$$\Phi = \mathrm{diag}\left(\sqrt{\frac{\mu}{R_{11}}},\ \sqrt{\frac{\mu}{R_{22}}},\ \cdots\ \sqrt{\frac{\mu}{R_{N_T N_T}}}\right)$$

$$\tilde{R} = \Phi R \Phi$$

where $N_T$ is the number of transmit antennas, R is the transmit spatial covariance matrix, $R_{ii}$ is the (i)th diagonal entry of the transmit spatial covariance matrix, i is an integer, $R_T$ the second matrix, and all diagonal elements of the second matrix are equal;

the analog coefficients are based on an extracted set of entries L, where $L=N_T(N_T+1)/2-(N_T-1)$ unique entries of the second matrix obtained by exploiting Hermitian symmetry of the second matrix ($R_{T,ij}=\mathrm{conj}(R_{T,ji})$ $R_{T,ij}$ being the (i,j)th entry of the second matrix) and selecting one diagonal element.

14. A orthogonal frequency division multiplexing (OFDM) wireless communication base unit comprising:
a processor
the processor is configured to obtain analog coefficients from a first portion of a second set of two or more OFDM subcarriers based on pilot symbols modulated on a second portion of the second set of two or more OFDM subcarriers, wherein the second set of two or more OFDM subcarriers correspond to a waveform received by the base unit,
the analog coefficients obtained by transforming a transmit spatial covariance matrix, the transmit spatial covariance matrix based on a first set of two or more OFDM subcarriers corresponding to a waveform transmitted from the base unit, and
the processor is configured to determine transmission parameters corresponding to the first set of two or more OFDM subcarrier based on the obtained analog coefficients.

15. The base unit of claim 14, wherein the processor is configured to select one or more OFDM sub-carriers for transmission to the terminal based on the analog coefficients.

16. The base unit of claim 14, wherein the processor is configured to request a wireless communication terminal to measure the transmit spatial covariance matrix on the first set of two or more OFDM subcarriers corresponding to the waveform transmitted from the base unit.

17. The base unit of claim 14, wherein the analog coefficients are obtained by transforming transmit spatial covariance matrices, each of the transmit spatial covariance matrices based on a corresponding set of two or more OFDM subcarriers corresponding to the waveform transmitted from the base unit.

18. The base unit of claim 14, wherein the processor is configured to determine one or more of a number of data streams to be transmitted, to transmit weight vectors and a modulation and coding scheme corresponding to a wireless communication terminal applicable for transmission on one or more of the first set of OFDM subcarriers.

19. The base unit of claim 14,
wherein the processor is configured to obtain two or more sets of analog coefficients corresponding to two or more wireless communication terminals from corresponding sets of OFDM subcarriers on the waveform received by the base unit,
wherein, based on the multiple sets of analog coefficients, the controller is configured to determine one or more of a number of data streams to be transmitted, transmit weight vectors and a modulation and coding scheme corresponding to each wireless communication terminal based on the multiple sets of analog coefficients applicable for transmission on the one or more of the first set of OFDM subcarriers.

20. An orthogonal frequency division multiplexing wireless communication terminal comprising:
the terminal configured to compute a transmit spatial covariance matrix corresponding to a channel estimated on a first set of two or more orthogonal frequency division multiplexing (OFDM) subcarriers corresponding to a received waveform,
the terminal configured to obtain a set of analog coefficients by transforming the transmit spatial covariance matrix,
the terminal configured to modulate the set of analog coefficients onto a first portion of a second set of two or more OFDM subcarriers corresponding to a transmitted waveform, where each analog coefficient is mapped to a single OFDM subcarrier, and
the terminal configured to modulate a pilot symbol onto a second portion of the second set of OFDM subcarriers.

21. The terminal of claim 20, wherein the set of analog coefficients are obtained without quantization.

22. The terminal of claim 20, wherein the pilot symbol is from a finite constellation of complex symbols.

* * * * *